Patented May 9, 1933

1,907,710

UNITED STATES PATENT OFFICE

SHAILER L. BASS, OF MIDLAND, MICHIGAN, ASSIGNOR TO THE DOW CHEMICAL COMPANY, OF MIDLAND, MICHIGAN, A CORPORATION OF MICHIGAN

METAL CATALYST AND PREPARATION THEREOF

No Drawing.   Application filed March 27, 1931. Serial No. 525,879.

The present invention relates to a metal catalyst suitable for use in the hydrogenation and dehydrogenation of organic compounds, and to methods of preparing same.

Hydrogenation and dehydrogenation reactions are known to be practically reversible, the course of the reaction depending largely on varying the temperature, so that the same catalysts are effective for both types of reaction. Zelinsky and co-workers (Ber. 44, 3121 (1911); 45, 3677—8 (1912); 58, 185 (1925)) studied numerous substances, such as nickel, aluminum, and other metals and their oxides, separately and in various combinations as catalytic materials for the present purpose. It is well known that suitable catalysts can be prepared by depositing a catalytic metal or oxide upon a relatively inert carrier substance or substrate such as pumice, filter-cel, and the like. To predict the relative effectiveness of such a catalyst, however, is practically impossible, because of the difficulties encountered in duplicating the preparation of a given catalyst and the difficulty of reactivating the same when once poisoned. Furthermore, such catalysts, i. e. catalytic metals deposited on a porous carrier of granular form, are inconvenient to use in vapor phase reactions of the aforementioned types, (1) because of their resistance to the flow of reactants and the space required to contain a given amount of catalytically active surface, and (2) because they must be in a later step of the process removed from the reaction product by filtration, or in other suitable manner. When using catalysts of the foregoing type, side reactions are found to occur, and also such catalysts are short-lived, become easily poisoned and cannot be reactivated advantageously.

In the course of investigations of other catalysts, a palladium catalyst was prepared by depositing palladium metal on a suitable metal foil at a low current density which was found to be catalytically active in certain instances and to prevent the occurrence of secondary reactions. Frequently, however, the palladium catalyst was entirely inactive, and in no instance was a product of high activity obtained. I have now found that a palladium catalyst, prepared by electrodepositing under certain definite conditions on a metallic substrate in convenient form such as a wire gauze or foil, and then further treated by superficially oxidizing and then reducing the deposited metal, possesses greatly enhanced catalytic properties and is must more resistant to poisoning. Catalysts thus prepared may be employed advantageously in either vapor or liquid phase hydrogenation and dehydrogenation reactions because: (1) of ease of duplicating results in the preparation of the catalyst; (2) of relatively small bulk of catalytic material; (3) of resistance of catalyst to poisoning; (4) no complicated separation of catalyst from liquid reaction product is necessary; and (5) such catalyst may be conveniently reactivated electrochemically. Other benefits and advantages will be noted as the description proceeds.

To the accomplishment of the foregoing and related ends, the invention, then, consists of the features hereinafter fully described and particularly pointed out in the claims, the following description setting forth in detail one form of product and several modes of carrying out my invention, such disclosed details illustrating, however, but several of the various ways in which the principle of the invention may be used.

In electrodepositing a metal such as palladium from a solution of one of its salts, three different types of deposit, each of more or less distinct properties, may be obtained. The properties of these deposits depend to a large extent upon the current density employed for the deposition thereof. For instance, (1) at a very low current density there is obtained a smooth, homogeneous metallic deposit which consists of very small, closely arranged particles presenting a minimum of exposed surface; (2) at a medium current density the individual particles by growth from closely arranged crystal centers or nuclei increase in size so that the deposit has a more or less rough and uneven surface, dark gray in color, but still dense and adherent; (3) at high current densities, hydrogen is liberated also and the metallic deposit is black in color, spongy and loose in character, and lacks adhesiveness so that portions thereof may be detached during deposition. Of the three aforesaid types of palladium deposit, I have found type (2) adapted for use in making my improved catalyst.

In general, to carry out my invention, palladium is deposited upon a suitable continuous metal substrate, such as a wire gauze or foil of palladium itself or of another metal such as copper, nickel, Monel metal, or equivalent thereof. Such electrodeposition is conducted under suitable conditions for producing a metallic surface of the second type referred to above. For instance, when palladium foil is used as a substrate, the same is made the cathode while a current density of approximately 5 to 15 milliamperes per sq. cm. of area, a dilute palladium chloride electrolyte, and a palladium anode, are employed. In the form thereby obtained, the catalyst presents a greatly increased surface and is sufficiently adherent to withstand considerable manipulation and scraping without the removal of substantial amounts thereof from the metal substrate.

When other metals are used as a substrate, copper for instance, the same is protected with a "strike" or smooth plating of palladium metal before the deposition of the active coating can be made. This is necessary because copper displaces palladium from the simpler palladium salts, e. g. palladium chloride, etc. It also displaces palladium from most complex salts such as $K_2Pd(CN)_4$ and $(NH_4)_2PdCl_4$, but not from the complex salt, potassium palladium nitrite $(K_2Pd(NO_2)_4$. A plating solution of the latter compound is accordingly made by adding potassium nitrite to an aqueous solution of palladium chloride containing a slight excess of hydrochloric acid and then boiling to expel chlorine and nitrogen oxides; and finally making up the solution to a desired strength. Making such solution the electrolyte, a copper gauze substrate the cathode, a palladium foil the anode, and employing a low current density, e. g. of about 1 milliampere or less per sq. cm. of gauze surface, for one-half hour to an hour, the copper gauze becomes covered with an even, fine grained deposit of palladium which has a bright appearance. The copper gauze thus coated when placed in a solution of palladium chloride does not displace the palladium thereof and may then be further electroplated at a higher current density, as in the first instance, to form the rough-surfaced deposit thereon. The palladium catalysts thus prepared are black to gray in color. Prior to use they are advisedly freed from chlorine adsorbed from the plating bath by electrolyzing as cathode in a bath of dilute sulphuric acid for a few minutes. They are quite active at first but deteriorate rather rapidly in use. However, they may be conveniently reactivated by heating in oxygen or air for a few hours at about 300° to 400° C., and then reducing in hydrogen at 250° to 300° C. By the aforesaid treatment the original gray to black rough-surfaced crystalline deposit, as observed under the microscope at about 225 × magnification, is transformed by coalescence of the crystals into irregular masses or clusters of dark gray metallic nodules thickly distributed or dispersed over the surface thereof. This pebbled appearance of the surface is quite characteristic. Such treated or reactivated catalyst is much more active than the original electrodeposited metal, and also is much less susceptible to poisoning. It will withstand repeated and long-continued usage without serious deterioration. When, after long use, its activity has been somewhat diminished, however, it may be easily restored by repeating the heat treatment in air and hydrogen successively as above described.

In order, therefore, to prepare a highly active and durable palladium catalyst which is most resistant to poisoning under normal conditions of usage, I have found it advantageous, first, to electrodeposit a plate thereof on a metallic substrate in the manner described, then to electrolyze in an acid bath to remove chlorine, and finally to activate the deposited metal by successively heating in air and in hydrogen. The following examples illustrate several of the various ways in which my invention may be carried out:—

*Example 1 (palladium deposited upon palladium wire gauze)*

(a) A 4 inch by 6 inch palladium wire gauze of 45 mesh, 0.0085 inch wire, was immersed as cathode in a 0.164 normal palladous chloride solution. 4.6938 grams of palladium were deposited thereon in about one-half hour, a current density of 11.6 milliamperes per sq. cm. being employed. The deposit on the gauze was dark gray and fairly adherent. It was then electrolyzed in a 1N sulphuric acid solution, the gauze being the cathode, the anode being of palladium foil, with a current of .2 amperes for about 5 minutes by means of which absorbed chlorine was expelled. The chlorine free gauze was washed, dried and then heated in oxygen at a temperature of about 400° C. for three hours and then in hydrogen at 250° to 300° for about an hour to remove the oxide coating formed in the previous step. The deposit thereon after this activation is light gray and densely granular, said gauze being highly active for the dehydrogenation of para-cyclohexylphenol to para-phenylphenol.

(b) To illustrate the use of the catalyst, six consecutive runs for dehydrogenating para-cyclohexylphenol to para-phenylphenol were made using the same palladium gauze catalyst prepared and activated as above described. In each run, 35 grams of para-cyclohexylphenol was vaporized per hour and passed through a chamber heated to 295° to 300° C. and containing said catalyst. Hydrogen was liberated from the cyclohexyl compound at the start of said dehydrogenation reaction at a rate of 300 to 475 cc. per minute. The yield of para-phenyl phenol (m. p. 156°–158° C. uncorrected) in each run was 90–95 per cent, based on a conversion of 90 to 95 per cent of the para-cyclohexylphenol used. The hydrogen eliminated in such dehydrogenation was of 99.5 per cent purity and was obtained in 92 to 94 per cent of the theoretical amount.

*Example 2 (palladium deposited upon copper wire gauze)*

(a) A 4 inch by 6 inch copper wire gauge of 80 mesh, 0.003 inch wire, was employed as a cathode in 600 cc. of a plating solution containing 8 molecular equivalents of potassium nitrite to 100 cc. of a 0.5 molar palladium chloride solution containing a slight excess of hydrochloric acid (which plating solution had been boiled until free from chlorine and nitrogen oxides). The anode was of palladium foil. A current of .5 amperes and 6 volts was now passed therethrough for 30 minutes. This corresponds to a current density of about 1 milliampere per sq. cm. of gauze surface. A deposit of 1.629 grams of palladium having a smooth dense surface was formed on the gauze. The thus obtained palladium-surfaced copper gauze was then further electrolyzed in a 0.2 molar solution of palladium chloride using a current density of about 5 milliamperes per sq. cm. for 30 minutes when an additional coating of palladium was deposited on the coil, but in a dispersed form similar to that obtained from the deposition in Example 1. Such catalyst deposit was then treated to further benefit and activate the same as described in the former example.

(b) 35 grams of para-cyclohexylphenol was refluxed, the vapors thereof being contacted with the above prepared palladium-copper catalyst. A conversion of the para-cyclohexylphenol to the para-phenylphenol by thus operating was approximately 66 per cent complete in two hours.

In my process, for preparing an active palladium catalyst, or when using the latter in a hydrogenation or dehydrogenation reaction, temperatures over about 400° C. are avoided, such higher temperatures favoring a coarse crystallization of the palladium with consequent brittleness thereof. A current density of approximately 5 to 14 milliamperes per sq. cm. is found best suited for producing the type of deposit desired, values much above or below the above range resulting in an inferior product lacking in catalytic activity and in other desirable properties. Also, when operating according to the conditions above specified, loss of the palladium metal is kept at a minimum and reactivation of the catalyst, when desired, is effected most conveniently.

In the foregoing are described preferred modes of making a palladium catalyst which possess superior catalytic properties when employed in processes for the hydrogenation and dehydrogenation of organic compounds. Such catalyst is strongly resistant to poisoning. It is also noted that palladium catalysts made by other methods and which may have very different physical properties may be activated or otherwise benefited when treated according to the activation step of my process, such activation being accomplished either with or without electrodepositing thereon a coating of palladium metal from a palladium chloride solution previous to such activation.

The advantages of the present invention are evidenced in the production of highly activated palladium catalysts, which (1) may be prepared by a convenient and easily reproducible method, (2) are suitable for both hydrogenation and dehydrogenation purposes in liquid and gaseous phase, (3) possess a relatively large active catalytic surface for a given volume, (4) offer little resistance to the flow of reactance as compared with the large catalytic surface thereof, thus being particularly adapted to be used in continuous processes, and (5) may be reactivated or renewed repeatedly.

My invention, then, consists of an improved palladium catalyst suitable for hydrogenation and dehydrogenation purposes, together with a novel method for preparing the same by electro-chemically depositing palladium in dispersed form on a continuous metal substrate; further treating such deposit by electrolyzing same in dilute acid to remove absorbed chlorine therefrom; and heating, first, in oxygen and then in hydrogen, by which the deposited palladium is converted into a gray, disperse, rough, and porous, but adherent, crystalline and strongly active catalytic surface.

Other modes of applying the principle of my invention may be employed instead of those explained, change being made as regards the details herein disclosed, provided the step or steps stated by any of the following claims or the equivalent thereof be employed.

I therefore particularly point out and distinctly claim as my invention:—

1. As an article of manufacture, a metallic body adapted to function as an active catalyst for hydrogenation reactions, the same having an adherent electrodeposited coating of metallic palladium and under the microscope exhibiting an unevenly pebbled surface formed by irregular clusters of nodules thickly distributed thereover.

2. As an article of manufacture, a metallic wire screen adapted to function as an active catalyst for hydrogenation reactions, the same having an adherent electrodeposited coating of metallic palladium and under the microscope exhibiting an unevenly pebbled surface formed by irregular clusters of nodules thickly distributed thereover.

3. In a method of making a palladium catalyst, the step which consists in electrodepositing palladium onto a metal surface from a palladium chloride solution at a current density of 5 to 15 milliamperes per sq. cm. of metal surface.

4. The method of making a palladium catalyst which comprises electrodepositing palladium onto palladium wire from a palladium chloride solution at a current density of 5 to 15 milliamperes per sq. cm. of metal surface, heating such deposit in oxygen and then in hydrogen.

5. The method of making a palladium catalyst which comprises electrodepositing a relatively smooth palladium surface onto copper, then electrodepositing palladium in dispersed form onto said smooth palladium from a palladium chloride solution at a current density of 5 to 15 milliamperes per sq. cm. of surface.

6. The method of making a palladium catalyst which comprises electrodepositing palladium onto a metal surface from a palladium chloride solution at a current density of 5 to 15 milliamperes per sq. cm. of metal surface, then electrolyzing the deposit as cathode in a dilute sulfuric acid solution, and heating the deposit first in oxygen at a temperature between about 300° and about 400° C. and then in hydrogen at a temperature between about 200° and about 350° C.

7. The method of activating a palladium catalyst intended for used in processes for the hydrogenation and dehydrogenation of organic compounds, which comprises heating the same in oxygen at a temperature between about 300° and about 400° C. and then in hydrogen at a temperature between about 200° and about 350° C.

8. The method of activating an electrodeposited palladium catalyst intended for use in processes for the hydrogenation and dehydrogenation of organic compounds, which comprises heating the same in oxygen at a temperature between about 300° and about 400° C. and then in hydrogen at a temperature between about 200° and about 300° C.

9. The method of activating a palladium catalyst intended for use in processes for the hydrogenation and dehydrogenation of organic compounds which comprises electrodepositing palladium on such palladium catalyst from a palladium chloride solution by using a current density of 5 to 15 milliamperes per sq. cm. of metal surface, then electrolyzing the deposit as cathode in dilute sulfuric acid solution, and heating the deposit, first in oxygen at a temperature between about 300° and about 400° C. and then in hydrogen at a temperature between about 200° and about 400° C.

10. A catalyst for hydrogenation and dehydrogenation reactions, having a surface of dispersed metallic palladium exhibiting under the microscope a pebbled or clustered appearance, said surface being formed by electrodepositing palladium from a palladium chloride solution on a surface of metallic palladium at a current density between 5 and 15 milliamperes per sq. cm. of metal surface, heating the so treated surface in the presence of oxygen to a temperature between about 300° and about 400° C., and then heating the surface in the presence of hydrogen to a temperature between about 200° and about 350° C.

Signed by me this 23rd day of March, 1931.

SHAILER L. BASS.